United States Patent
Tran et al.

(10) Patent No.: US 10,417,799 B2
(45) Date of Patent: Sep. 17, 2019

(54) SYSTEMS AND METHODS FOR GENERATING AND PRESENTING PUBLISHABLE COLLECTIONS OF RELATED MEDIA CONTENT ITEMS

(71) Applicant: Facebook, Inc., Menlo Park, CA (US)

(72) Inventors: Thai Gia Tran, Redwood City, CA (US); Christophe Marcel Rene Tauziet, San Francisco, CA (US); Judy Liu, San Francisco, CA (US); Jeffrey Lin, Palo Alto, CA (US); Tomer Bar, San Francisco, CA (US); Kejia Zhu, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 369 days.

(21) Appl. No.: 14/706,921

(22) Filed: May 7, 2015

(65) Prior Publication Data
US 2016/0328096 A1    Nov. 10, 2016

(51) Int. Cl.
*G06T 11/60* (2006.01)
*G06F 16/48* (2019.01)

(52) U.S. Cl.
CPC .............. *G06T 11/60* (2013.01); *G06F 16/48* (2019.01)

(58) Field of Classification Search
None
See application file for complete search history.

(56) References Cited

U.S. PATENT DOCUMENTS

| | | | |
|---|---|---|---|
| 9,021,366 B1* | 4/2015 | Charytoniuk | G06Q 10/10 715/738 |
| 2006/0222243 A1* | 10/2006 | Newell | H04N 1/3935 382/173 |
| 2010/0259544 A1* | 10/2010 | Chen | H04N 1/00132 345/441 |
| 2010/0310135 A1* | 12/2010 | Nagaoka | G06F 17/30247 382/118 |
| 2011/0029928 A1* | 2/2011 | Bachman | G06F 17/30749 715/841 |
| 2011/0087666 A1* | 4/2011 | Chou | G06F 17/30247 707/737 |
| 2011/0145275 A1* | 6/2011 | Stewart | G06F 17/3002 707/769 |

(Continued)

*Primary Examiner* — Toan H Vu
(74) *Attorney, Agent, or Firm* — Sheppard Mullin Richter & Hampton LLP

(57) ABSTRACT

A plurality of media content items associated with a user and stored locally can be identified. Information associated with the plurality can be acquired. The information can include time data, location data, and/or social graph data. It can be determined, based on the information, that a collection of media content items, out of the plurality, are related. A layout customized for the collection can be generated. Moreover, the collection of media content items that are determined to be related can be identified. The collection can be presented as a collage based on the layout customized for the collection. Contextual information associated with the collage can be acquired. The contextual information can include time data, location data, and/or social graph data. A particular virtual overlaying template can be selected based on the contextual information. The collage can be presented in conjunction with the particular virtual overlaying template.

19 Claims, 14 Drawing Sheets

(56) References Cited

U.S. PATENT DOCUMENTS

| | | | |
|---|---|---|---|
| 2012/0054668 A1* | 3/2012 | Ahn | G06F 17/30241 |
| | | | 715/781 |
| 2012/0304087 A1* | 11/2012 | Walkin | G06F 17/30241 |
| | | | 715/764 |
| 2013/0030909 A1* | 1/2013 | Shih | G06Q 30/0277 |
| | | | 705/14.48 |
| 2014/0040774 A1* | 2/2014 | Charytoniuk | G06F 17/30268 |
| | | | 715/753 |
| 2014/0056539 A1* | 2/2014 | Kashiwa | G11B 27/034 |
| | | | 382/278 |
| 2014/0101138 A1* | 4/2014 | Sugita | G06F 17/3005 |
| | | | 707/722 |
| 2014/0137011 A1* | 5/2014 | Matas | G06Q 10/10 |
| | | | 715/764 |
| 2014/0170547 A1* | 6/2014 | Farrugia | C08G 63/181 |
| | | | 430/105 |
| 2015/0086116 A1* | 3/2015 | Yamaji | G06K 9/00684 |
| | | | 382/190 |
| 2015/0261994 A1* | 9/2015 | Yamaji | G06K 9/00288 |
| | | | 382/118 |
| 2015/0304437 A1* | 10/2015 | Vaccari | G06F 1/3215 |
| | | | 709/204 |
| 2015/0331566 A1* | 11/2015 | Yonaha | G06K 9/00221 |
| | | | 715/776 |
| 2016/0055379 A1* | 2/2016 | Svendsen | G06F 17/30244 |
| | | | 382/224 |
| 2016/0139761 A1* | 5/2016 | Grosz | G06F 3/1243 |
| | | | 715/769 |
| 2016/0139793 A1* | 5/2016 | Kish | G06F 3/04842 |
| | | | 715/786 |

* cited by examiner

550 ↘

```
┌─────────────────────────────────────────────────────────────────────────┐
│ Determine that one or more media content items in the plurality of      │
│ media content items have less than a specified threshold confidence     │
│ of being relevant for publishing                                        │
│                                  552                                    │
└─────────────────────────────────────────────────────────────────────────┘
                                    │
                                    ▼
┌─────────────────────────────────────────────────────────────────────────┐
│ Prevent the one or more media content items from being included in      │
│ the collection of media content items                                   │
│                                  554                                    │
└─────────────────────────────────────────────────────────────────────────┘
                                    │
                                    ▼
┌─────────────────────────────────────────────────────────────────────────┐
│ Present the collection of media content items as a collage of media     │
│ content items based on the layout                                       │
│                                  556                                    │
└─────────────────────────────────────────────────────────────────────────┘
                                    │
                                    ▼
┌─────────────────────────────────────────────────────────────────────────┐
│ Provide an option for the user to publish the collage of media content  │
│ items                                                                   │
│                                  558                                    │
└─────────────────────────────────────────────────────────────────────────┘
```

```
Determine, based on analyzing the contextual information, a theme associated with the
media content items in the collage
652
                                    │
                                    ▼
Identify one or more virtual overlaying templates that each have at least a respective
threshold confidence of relevancy with respect to the theme
654
                                    │
                                    ▼
Select the particular virtual overlaying template out of the one or more virtual overlaying
templates
656
```

FIGURE 6B

SYSTEMS AND METHODS FOR GENERATING AND PRESENTING PUBLISHABLE COLLECTIONS OF RELATED MEDIA CONTENT ITEMS

FIELD OF THE INVENTION

The present technology relates to the field of media processing. More particularly, the present technology relates to techniques for generating and presenting publishable collections of related media content items.

BACKGROUND

Today, people often utilize computing devices (or systems) for a wide variety of purposes. Users can use their computing devices to, for example, interact with one another, access content, share content, and create content. In some cases, a user of a social networking system (or service) can utilize his or her computing device to create and post (or publish) media content items, such as images, videos, audio, and text. Under conventional approaches, access to the media content items can be provided via a variety of manners, such as a profile page of the user or via a social networking feed. In one example, the user's connections or friends within the social networking system can access the user's published media content items via the user's profile page, as long as the user's privacy settings or preferences allow so. In another example, the user's connections or friends can access the user's published media content items via their respective social networking feeds, in accordance with the user's privacy settings or preferences.

Under conventional approaches, media content items associated with the user are generally provided in an uninteresting or inefficient manner. In one example, conventional approaches generally present the user's published content in a static or boring manner. In another example, the user has to exert significant manual effort to select and prepare the content for publishing. As such, conventional approaches can create challenges for or reduce the overall user experience associated with providing content via the social networking system.

SUMMARY

Various embodiments of the present disclosure can include systems, methods, and non-transitory computer readable media configured to identify a plurality of media content items associated with a user and stored locally. Information associated with the plurality of media content items can be acquired. The information can include at least one of time data, location data, or social graph data. It can be determined, based on the information, that a collection of media content items, out of the plurality of media content items, are related. A layout customized for the collection of media content items can be generated.

In an embodiment, it can be determined that one or more media content items in the plurality of media content items have less than a specified threshold confidence of being relevant for publishing. The one or more media content items can be prevented from being included in the collection of media content items. The collection of media content items can be presented as a collage of media content items based on the layout. An option for the user to publish the collage of media content items can be provided.

In an embodiment, one or more object recognition processes can be applied with respect to the collection to recognize one or more objects depicted in at least one media content item in the collection. The at least one media content item can be placed in a larger frame of the collage relative to other frames in which other media content items in the collage are placed.

In an embodiment, the one or more object detection processes can include at least one of a face detection process, a face recognition process, or an image classification process.

In an embodiment, prior to placing the at least one media content item in the larger frame of the collage, the one or more object detection processes can recognize, in the at least one media content item, at least one of: 1) a threshold quantity of objects or 2) a face of a friend having at least a specified threshold social affinity level with respect to the user.

In an embodiment, determining that the collection of media content items are related can further comprise identifying, out of the plurality of media content items, at least one of: 1) a first set of media content items that are acquired within an allowable time deviation from one another in the first set based on the time data, 2) a second set of media content items that are acquired within an allowable locational deviation from one another in the second set based on the location data, or 3) a third set of media content items that have at least a threshold level of social commonality relative to one another in the third set based on the social graph data. At least one of the first set, the second set, or the third set can be included in the collection of media content items.

In an embodiment, the collection of media content items can include at least one of an image, a series of images acquired within a particular time frame, a video, or an audio.

In an embodiment, a playback of at least one of the video, the audio, or an animation of the series of images can be automatically presented.

In an embodiment, one or more image analysis processes can be applied with respect to the series of images. It can be determined, based on the one or more image analysis processes, that one or more images out of the series of images have less than a threshold level of image similarity with respect to other images in the series of images. The one or more images can be removed from the series of images.

In an embodiment, the layout can be customized for the collection based on at least one of: 1) a quantity of the media content items in the collection, 2) orientations of the media content items in the collection, or 3) media types of the media content items in the collection.

Moreover, various embodiments of the present disclosure can include systems, methods, and non-transitory computer readable media configured to identify a collection of media content items that are determined to be related. The collection can be presented as a collage based on a layout customized for the collection. Contextual information associated with the collage can be acquired. The contextual information can include at least one of time data, location data, or social graph data. A particular virtual overlaying template can be selected based on the contextual information. The collage can be presented in conjunction with the particular virtual overlaying template.

In an embodiment, selecting the particular virtual overlaying template based on the contextual information can further comprise determining, based on analyzing the contextual information, a theme associated with the media content items in the collage. One or more virtual overlaying templates that each have at least a respective threshold confidence of relevancy with respect to the theme can be identified. The particular virtual overlaying template can be selected out of the one or more virtual overlaying templates.

In an embodiment, the one or more virtual overlaying templates can be ranked based on the respective threshold confidence for each of the one or more virtual overlaying templates. The particular virtual overlaying template can correspond to a highest-ranked virtual overlaying template out of the one or more virtual overlaying templates.

In an embodiment, the theme can be associated with at least one of a brand, a figure, an organization, a sport, an event, a landmark, a celebration, a holiday, a topic, a subject, or an atmospheric state.

In an embodiment, the theme can be associated with at least one of a product or a service. The particular virtual overlaying template can be provided by an advertiser of the at least one of the product or the service.

In an embodiment, the particular virtual overlaying template can include one or more visible elements associated with the theme. The one or more visible elements can include at least one of a decoration, a sticker, a character, a logo, a mark, a color, or text.

In an embodiment, the media content items in the collage can be presented via a plurality of tiles. The one or more visible elements can be included in at least some of the plurality of tiles.

In an embodiment, the particular virtual overlaying template can be at least one of modifiable in real-time, updateable in real-time, or replaceable in real-time.

In an embodiment, selecting the particular virtual overlaying template can be further based on a user command.

In an embodiment, the time data can be associated with at least one of a time of day, a date, or a relative time. The location data can be associated with at least one of a check-in, a GPS signal, a cellular triangulation signal, a wireless network signal, or a personal area network signal. The social graph data can be associated with at least one of: 1) a user of a computing system that presents the collage in conjunction with the particular virtual overlaying template or 2) the media content items in the collage.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5B illustrates an example method associated with generating and presenting publishable collections of related media content items, according to an embodiment of the present disclosure.

FIG. 6B illustrates an example method associated with generating and presenting publishable collections of related media content items, according to an embodiment of the present disclosure.

Figure 1:
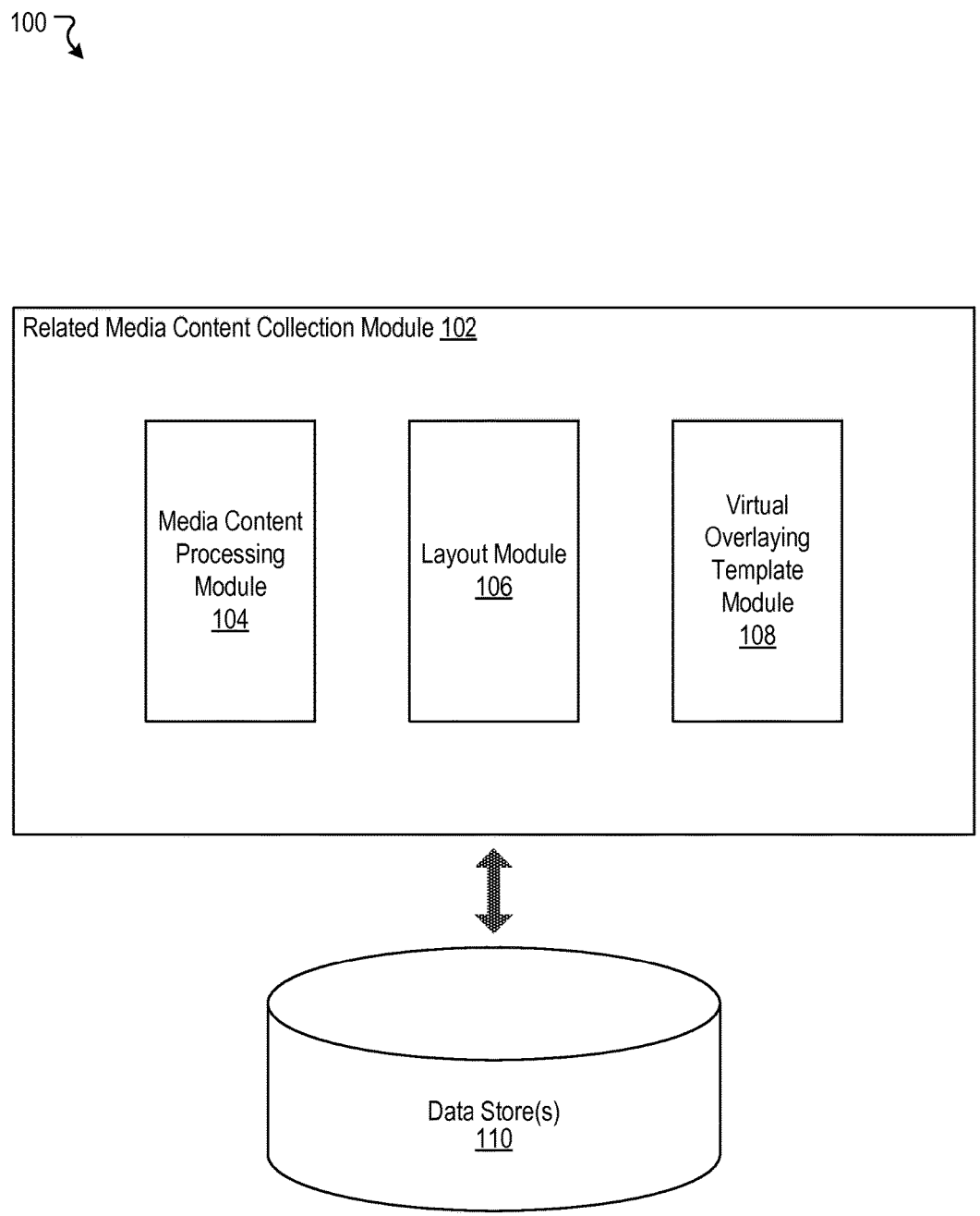
FIG. 1 illustrates an example system including an example related media content collection module configured to facilitate generating and presenting publishable collections of related media content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Generating and Presenting Publishable Collections of Related Media Content Items People use social networking systems (or services) for various purposes. Users of a social networking system can utilize their computing devices (or systems) to establish connections, communicate, and interact with one another via the social networking system. Users can also provide, edit, share, or access media content items such as pictures, videos, audio, and text. In one example, a user of the social networking service can post or publish media content items, which can be presented on a profile page of the user, such as on a timeline which includes one or more collections of media content items associated with the user. The user's social connections or friends can, for example, access, view, or interact with such media content items published on the profile page (e.g., timeline) of the user, as long as the user's privacy settings or preferences allow so. In another example, the media content items published or posted by the user can be surfaced to the user's social connections via their social networking feeds. Each of the user's social connections can, for instance, have a respective newsfeed in the social networking system, such that the user's published media content items can be presentable via the respective newsfeed for each of the user's social connections, in accordance with the user's privacy settings or preferences.

Under conventional approaches to publishing media, it can sometimes be inconvenient, tedious, or otherwise difficult for the user to share, post, or publish media content. In one example, the user may forget to publish certain media content items that the user has acquired on his or her computing system (or device). In another example, it can be too time-consuming or can require significant manual effort to select, edit, caption, tag, and/or publish media content items. Moreover, conventional approaches generally provide access to media content items in an uninteresting or inefficient manner. For instance, conventional approaches often times present or display the user's published media content items in a predictable or static manner. These and other similar concerns can reduce the overall user experience associated with utilizing media content within social networking systems.

Therefore, an improved approach can be beneficial for addressing or alleviating various concerns associated with conventional approaches. The disclosed technology can generate and present publishable collections of related media content items. Various embodiments of the present disclosure can identify a plurality of media content items associated with a user and stored locally. Information associated with the plurality of media content items can be acquired. The information can include at least one of time data, location data, or social graph data. It can be determined, based on the information, that a collection of media content items, out of the plurality of media content items, are related. A layout customized for the collection of media content items can be generated. The collection can be presented as a collage based on a layout customized for the collection. Contextual information associated with the collage can be acquired. The contextual information can include at least one of time data, location data, or social graph data. A particular virtual overlaying template can be selected based on the contextual information. The collage can be presented in conjunction with the particular virtual overlaying template. It is contemplated that there can be many variations and/or other possibilities.

FIG. 1 illustrates an example system 100 including an example related media content collection module 102 configured to facilitate generating and presenting publishable collections of related media content items, according to an embodiment of the present disclosure. As shown in the example of FIG. 1, the example related media content collection module 102 can include a media content processing module 104, a layout module 106, and a virtual overlaying template module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the related media content collection module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the related media content collection module 102 can be implemented, in part or in whole, as software running on one or more computing devices or systems, such as on a user or client computing device. For example, the related media content collection module 102 or at least a portion thereof can be implemented as or within an application (e.g., app), a program, or an applet, etc., running on a user computing device or a client computing system, such as the user device 710 of FIG. 7. In another example, the related media content collection module 102 or at least a portion thereof can be implemented using one or more computing devices or systems that include one or more servers, such as network servers or cloud servers. In some instances, the related media content collection module 102 can, in part or in whole, be implemented within or configured to operate in conjunction with a social networking system (or service), such as the social networking system 730 of FIG. 7. It should be understood that there can be many variations or other possibilities.

In some implementations, the media content processing module 104 can be configured to facilitate identifying a plurality of media content items associated with a user and stored locally. For instance, the media content processing module 104 can identify, and/or detect the presence of, a plurality of images and videos that are stored locally in a camera roll of the user's computing device (or system). The media content processing module 104 can also be configured to acquire information, such as time data, location data, and/or social graph data, associated with the plurality of media content items. Based on (i.e., based at least in part on) the information, the media content processing module 104 can determine that a collection of media content items, out of the plurality of media content items, are related. For example, the media content processing module 104 can determine that a certain set, cluster, or collection of images and videos, out of all images and videos stored locally in the user's camera roll, are tagged with or otherwise associated with a common time (and/or date) range, a common location or region, and/or a common group of users of the social networking system. As such, this certain set, cluster, or collection of images and videos can be determined and/or recognized by the media content processing module 104 as being related. In some cases, an example of the collection of media content items can include at least one of an image, a series of images acquired within a particular time frame (e.g., a burst of images captured within a second or a few seconds), a video, or an audio. It is contemplated that all examples herein are provided for illustrative purposes and that there can be many variations or other possibilities. The media content processing module 104 will be discussed in more detail below with reference to FIG. 2A.

Moreover, in some embodiments, the layout module 106 can be configured to facilitate generating a layout customized for the collection of media content items. For instance, the layout can be customized based on the number of media content items that are in the collection, the orientations (e.g., landscape, portrait, square, etc.) of media content items in the collection, and/or the types (e.g., images, videos, graphics interchange format (GIF) image series, etc.) of media content items in the collection. In some cases, the collection of media content items can be presented as a collage of media content items based on (i.e., based at least in part on) the layout. An option for the user to publish (e.g., via the social networking system) the collage of media content items can be provided. More details regarding the layout module 106 will be provided below with reference to FIG. 2B.

Further, in some implementations, the media content processing module 104 can be configured to facilitate identifying a collection of media content items that are determined to be related. In one example, the user can select or choose a particular collection including certain media content items that have been determined and/or recognized, by the media content processing module 104, to be related to one another. In this example, the user's selection or choice can cause the media content processing module 104 to identify the particular collection of media content items. In some cases, the particular collection can be presented as a collage based on the layout customized for the collection. Moreover, the media content processing module 104 can be configured to acquire contextual information, such as time data, location data, and/or social graph data, associated with the collage. Again, many variations are possible.

Additionally, in some embodiments, the virtual overlaying template module 108 can be configured to facilitate selecting a particular virtual overlaying template based on the contextual information. The virtual overlaying template module 108 can also be configured to facilitate presenting the collage in conjunction with the particular virtual overlaying template. The virtual overlaying template module 108 will be discussed in more detail below with reference to FIG. 2C.

Furthermore, in some embodiments, the related media content collection module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, user specified settings, content produced by users, and various other types of user data. In some embodiments, the at least one data store 110 can store information that is utilizable by the related media content collection module 102. It should be appreciated that there can be many variations and other possibilities.

Figure 2A:
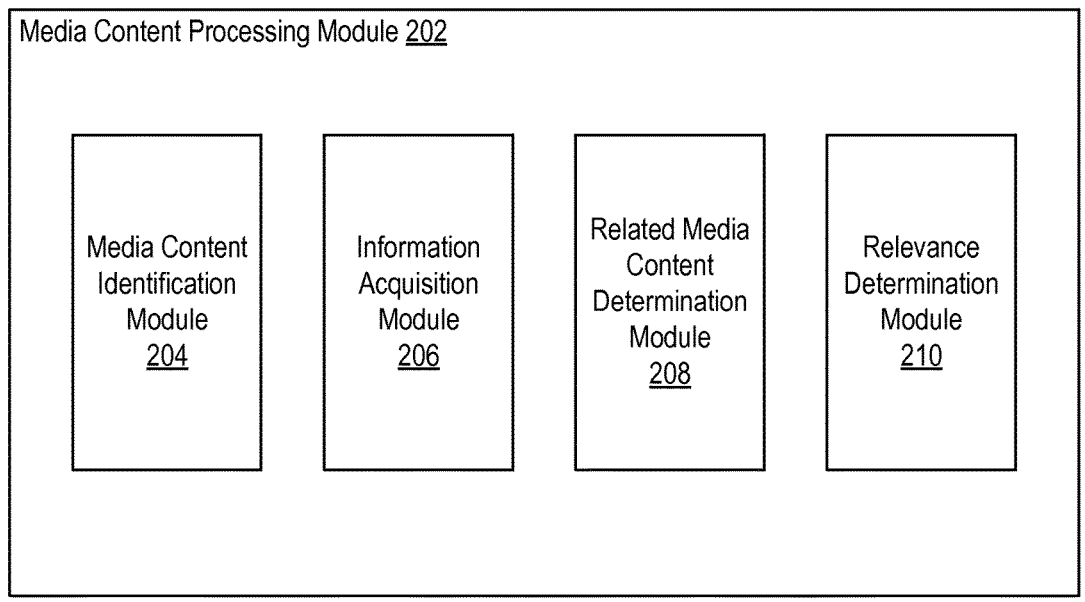
FIG. 2A illustrates an example media content processing module configured to facilitate generating and presenting publishable collections of related media content items, according to an embodiment of the present disclosure.

FIG. 2A illustrates an example media content processing module 202 configured to facilitate generating and presenting publishable collections of related media content items, according to an embodiment of the present disclosure. In some embodiments, the media content processing module 104 of FIG. 1 can be implemented as the example media content processing module 202. As shown in FIG. 2A, the example media content processing module 202 can include a media content identification module 204, an information acquisition module 206, a related media content determination module 208, and a relevance determination module 210.

In some embodiments, the media content processing module 202 can utilize the media content identification module 204 to facilitate identifying a plurality of media content items associated with a user and stored locally. In some cases, the media content processing module 202 can be implemented and/or running on a computing system (or device) of a particular user. The media content identification module 204 can detect the presence of all media content items, such as images and videos, stored locally in a camera roll or a media library of the particular user's computing system. The media content identification module 204 can identify each media content item, for instance, via each media content item's file name, location, index, and/or another identifier. It should be understood that many variations are possible.

Moreover, in some implementations, the media content processing module 202 can utilize the information acquisition module 206 to facilitate acquiring information associated with the plurality of media content items. In some instances, the information acquisition module 206 can pull, fetch, retrieve, access, receive, or otherwise acquire information including time data, location data, social graph data, metadata, properties, and/or other information related to the plurality of media content items. For example, the information acquisition module 206 can acquire time data that indicates at what time (and/or date) each image or video in the user's camera roll was captured, recorded, or otherwise acquired. In another example, the location data can indicate at what location, address, area, and/or region, etc., each image or video was acquired. In a further example, the social graph data can indicate which users of the social networking system are associated with each image or video, such as based on tags, mentions, check-ins, and/or face recognition.

In some embodiments, the media content processing module 202 can utilize the related media content determination module 208 to facilitate determining, based on the information, that a collection of media content items, out of the plurality of media content items, are related. For instance, often times the user can capture, record, or acquire images and videos (or other media content items) at a particular event, such as a vacation, a concert, or a celebration. Such images and videos acquired at the particular event can all be associated with a similar time frame and/or a similar location. Also, a same (or substantially similar) group of users can be tagged and/or depicted in at least some of these images and videos. As such, these images and videos can be determined and/or recognized by the related media content determination module 208 to be related, and thus can be placed into a particular media content collection (e.g., an album, a directory, etc.).

In one example, the related media content determination module 208 can determine that the collection of media content items are related based on identifying, out of the plurality of media content items, a first set of media content items that are acquired within an allowable time deviation (e.g., within a specified time frame) from one another in the first set based on the time data, a second set of media content items that are acquired within an allowable locational deviation (e.g., within a specified proximity) from one another in the second set based on the location data, and/or a third set of media content items that have at least a threshold level of social commonality (e.g., similar users, similar tags, similar check-ins, etc.) relative to one another in the third set based on the social graph data. In this example, media content items in one set can also be included in another set. The related media content determination module 208 can then include the first set, the second set, and/or the third set in the collection of media content items. It should be appreciated that many variations are possible.

Moreover, in some implementations, the media content processing module 202 can utilize the media content identification module 204 to facilitate identifying a collection of media content items that are determined to be related, such as the particular media content collection discussed above. In some cases, the collection identified by the media content identification module 204 can correspond to a collection of media content items presented as a collage based on a layout customized for the collection. In one example, a particular media album can be presented as a collage of still images, GIF images, and/or videos. This collage can be presented in a layout customized based on the images and/or videos in the particular media album. In this example, there can also be many other media albums presented as other collages. In some instances, the user can select, choose, or otherwise engage with the particular media album to cause the media content identification module 204 to identify the particular media album. In some cases, the particular media album or collection can be identified when its media content items are determined to be related to one another. It should be understood that there can be many variations or other possibilities.

Furthermore, in some embodiments, the media content processing module 202 can utilize the information acquisition module 206 to facilitate acquiring contextual information associated with the collage. The contextual information can include at least one of time data, location data, or social graph data, etc. In some cases, the time data can be associated with at least one of a time of day, a date, or a relative time (e.g., a few seconds ago, 1 minute ago, 3 hours ago, 2 years ago, etc.). The time data can, for example, indicate when media content in the collage was acquired. In some instances, the location data can be associated with at least one of a check-in, a Global Positioning System (GPS) signal, a cellular triangulation signal, a wireless network (e.g., WiFi) signal, or a personal area network (e.g., Bluetooth) signal. The location data can, for instance, indicate where the media content in the collage was acquired. In some cases, the social graph data can be associated with at least one of the user of the computing system or the media content in the collage. The social graph data can, for example, indicate or provide social properties or characteristics of the collage, such as by providing identifications of those who are tagged with or depicted in the media content in the collage. Subsequently, in some embodiments, a particular virtual overlaying template can be selected based on the contextual information and then presented in conjunction with the collage. Many variations are possible.

Additionally, in some implementations, the relevance determination module 210 can be configured to facilitate determining that one or more media content items in the plurality of media content items have less than a specified threshold confidence of being relevant for publishing. The relevance determination module 210 can prevent the one or more media content items from being included in the collection of media content items. For instance, the relevance determination module 210 can analyze images and videos in the user's camera roll to remove or filter out content that has a specified threshold likelihood of being irrelevant, undesirable, or unsuitable for publishing, such as screenshots, images of receipts, downloaded images, and so forth. In some embodiments, the relevance determination module 210 can utilize one or more image analysis processes to determine which images, videos (e.g., a set of image frames), and/or other media content items are likely irrelevant, undesirable, or unsuitable for publishing. In some cases, an image analysis process can include, but is not limited to, an image classification process, a video image frame analysis process, an object analysis process, a facial analysis process, a color analysis process, and/or a lightning analysis process, etc.

In one example, the relevance determination module 210 can apply the one or more image analysis processes with respect to a series (or burst) of images. The relevance determination module 210 can determine, based on the one or more image analysis processes, that one or more images out of the series of images have less than a threshold level of image similarity with respect to other images in the series of images. In this example, the one or more images can be blurry and/or can depict or include an object (e.g., finger) that has blocked the view of the camera capturing the series of images. As such, these one or more images can be determined as not being sufficiently similar to the other images in the series. Accordingly, the relevance determination module 210 can remove the one or more images from the series of images. As discussed above, there can be many variations or other possibilities.

Figure 2B:
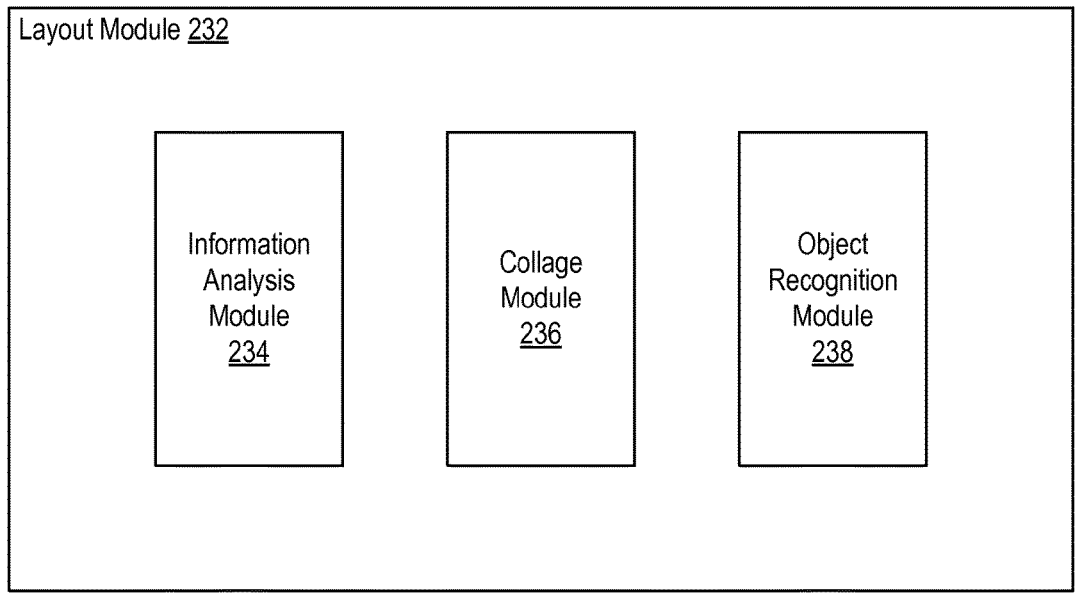
FIG. 2B illustrates an example layout module configured to facilitate generating and presenting publishable collections of related media content items, according to an embodiment of the present disclosure.

FIG. 2B illustrates an example layout module 232 configured to facilitate generating and presenting publishable collections of related media content items, according to an embodiment of the present disclosure. In some embodiments, the layout module 106 of FIG. 1 can be implemented as the example layout module 232. As shown in FIG. 2B, the example layout module 232 can include an information analysis module 234, a collage module 236, and an object recognition module 238.

As discussed above, the layout module 232 can be configured to generate a layout customized for a collection of media content items. In some implementations, the layout module 232 can utilize the information analysis module 234 to analyze information associated with the collection of media content items. In one example, the information analysis module 234 can analyze the information association with the collection to determine a quantity of the media content items in the collection, such as a number of images, a number of image series or bursts, a number of videos, and/or a number of total media content items in the collection. In another example, the information analysis module 234 can analyze the information association with the collection to determine orientations of the media content items in the collection, such as whether content items are in a portrait orientation, a landscape orientation, or a symmetrical orientation (e.g., a square media content item). In a further example, the information analysis module 234 can analyze the information association with the collection to determine media types of the media content items in the collection, such as whether certain media content items are images, videos, and/or image series or bursts, etc. Accordingly, the layout can be customized for the collection based on the information associated with the collection, which can indicate at least one of the quantity of the media content items in the collection, the orientations of the media content items in the collection, or the media types of the media content items in the collection. It is contemplated that many variations are possible.

Moreover, in some instances, the layout module 232 can utilize the collage module 236 to facilitate presenting the collection of media content items as a collage of media content items based on the layout. As discussed previously, the collection of media content items can include at least one of an image, a series of images acquired within a particular time frame, a video, or an audio. In some embodiments, the collage module 236 can facilitate automatically presenting a playback of at least one of the video, the audio, or an animation of the series of images. The playback can be repeated over time, such as a looped video playback or a looped image series playback (e.g., similar to that of a looping GIF image file). In one example, there can be multiple image series. Each of the multiple image series can, in some cases, start and/or continue animating through its respective image series at a different time interval.

Furthermore, in some embodiments, the layout module 232 can utilize the object recognition module 238 to apply one or more object recognition processes with respect to the collection in order to recognize one or more objects depicted in at least one media content item in the collection. Examples of an object detection process can include, but are not limited to, a face detection process, a face recognition process, and/or an image classification process, etc. In some implementations, the layout module 232 can place the at least one media content item in a larger frame (or tile) of the collage relative to other frames in which other media content items in the collage are placed. In some cases, prior to the at least one media content item being placed in the larger frame of the collage, the one or more object detection processes can recognize, in the at least one media content item, at least one of a threshold quantity of objects or a face of a friend having at least a specified threshold social affinity level with respect to the user.

In one example, the object recognition module 238 can apply one or more face detection processes to the collection. In this example, the object recognition module 238 can detect that a certain image depicts or includes more face objects of people (i.e., people's faces) than do other content items in the collection. As such, the layout module 232 can place this certain image in the larger frame of the collage to more prominently show the face objects (i.e., faces) of the people. In another example, the object recognition module 238 can apply one or more face recognition processes to the collection. In this example, the object recognition module 238 can recognize, in a particular image out of the collection, a face of a close friend of the user. The close friend (or close social connection) of the user can have at least the specified threshold social affinity level with respect to the user. As such, the layout module 232 can place the particular image in the larger frame of the collage to more prominently show the close friend (i.e., the close friend's face). Again, all examples herein are provided for illustrative purposes and there can be many variations or other possibilities.

Figure 2C:
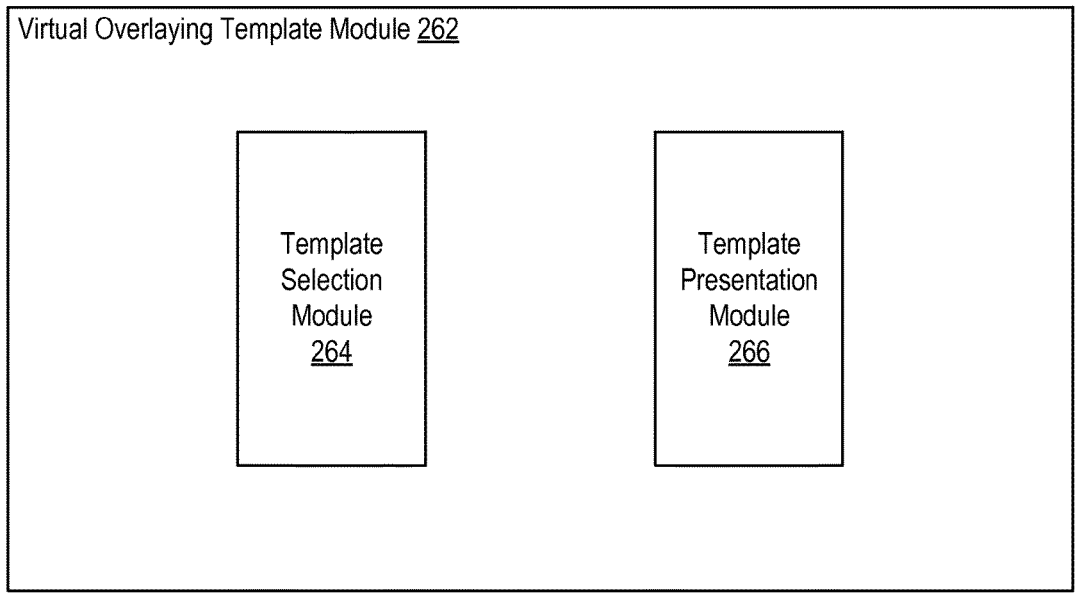
FIG. 2C illustrates an example virtual overlaying template module configured to facilitate generating and presenting publishable collections of related media content items, according to an embodiment of the present disclosure.

FIG. 2C illustrates an example virtual overlaying template module 262 configured to facilitate generating and presenting publishable collections of related media content items, according to an embodiment of the present disclosure. In some embodiments, the virtual overlaying template module 108 of FIG. 1 can be implemented as the example virtual overlaying template module 262. As shown in FIG. 2C, the example virtual overlaying template module 262 can include a template selection module 264 and a template presentation module 266.

As discussed above, a collection of media content items that are determined to be related can be identified. The collection can be presented as a collage based on a layout customized for the collection. Contextual information associated with the collage can be acquired. The contextual information can include at least one of time data, location data, or social graph data. The virtual overlaying template module 262 can be configured to facilitate selecting a particular virtual overlaying template based on the contextual information and to facilitate presenting the collage in conjunction with the particular virtual overlaying template.

In some implementations, the virtual overlaying template module 262 can utilize the template selection module 264 to select the particular virtual overlaying template based on the contextual information. The template selection module 264 can analyze the contextual information and then determine, based on analyzing the contextual information, a theme associated with the media content items in the collage. The template selection module 264 can also identify one or more virtual overlaying templates that each have at least a respective threshold confidence of relevancy with respect to the theme. The template selection module 264 can further select the particular virtual overlaying template out of the one or more virtual overlaying templates.

In one example, contextual information including location data, social check-in data, etc., can be analyzed by the template selection module 264 to determine that the media content items in the collage are acquired at a particular landmark theme. As such, the template selection module 264 can identify a set of one or more templates that each have at least a minimum likelihood and/or degree of being relevant to or associated with the landmark theme. The template selection module 264 can further select one of the templates, out of the set, to be presented in conjunction with the collage.

In some embodiments, the template selection module 264 can rank the one or more virtual overlaying templates based on the respective threshold confidence for each of the one or more virtual overlaying templates. The particular virtual overlaying template selected by the template selection module 264 can correspond to a highest-ranked virtual overlaying template out of the one or more virtual overlaying templates. Continuing with the previous example, the template selection module 264 can select, out of the set, the template that has the highest likelihood and/or degree of relevance relative to the landmark theme.

In some instances, the theme can be associated with any person, group of persons, organization, entity, object, location, activity, quality, state, etc., such as at least one of a brand (e.g., a business), a figure (e.g., an entity, a character), an organization, a sport, an event, a landmark (e.g., tourist attraction, famous place, park), a celebration, a holiday, a topic, a subject, and/or an atmospheric state (e.g., weather, temperature), etc. In some cases, the theme can be associated with at least one of a product or a service and the particular virtual overlaying template can be provided by an advertiser of the at least one of the product or the service.

In some embodiments, the virtual overlaying template module 262 can utilize the template presentation module 266 to present the collage in conjunction with the particular virtual overlaying template. The particular virtual overlaying template can, in some cases, include one or more visible elements associated with the theme. Examples of the one or more visible elements can include, but are not limited to, at least one of a decoration, a sticker, a character (e.g., a cartoon entity, a mascot), a logo, a mark, a color, and/or text, etc. In some implementations, the media content items in the collage can be presented via a plurality of tiles (or frames) and the one or more visible elements can be included in at least some of the plurality of tiles.

Moreover, the virtual overlaying template module 262 can enable the particular virtual overlaying template to be modifiable in (or near) real-time, updateable in (or near) real-time, and/or replaceable in (or near) real-time. It should be understood that there can be many variations or other possibilities. For instance, selecting the particular virtual overlaying template can, in some cases, be further based on a user command (e.g., user controls, user edits, etc.).

Figure 3A:
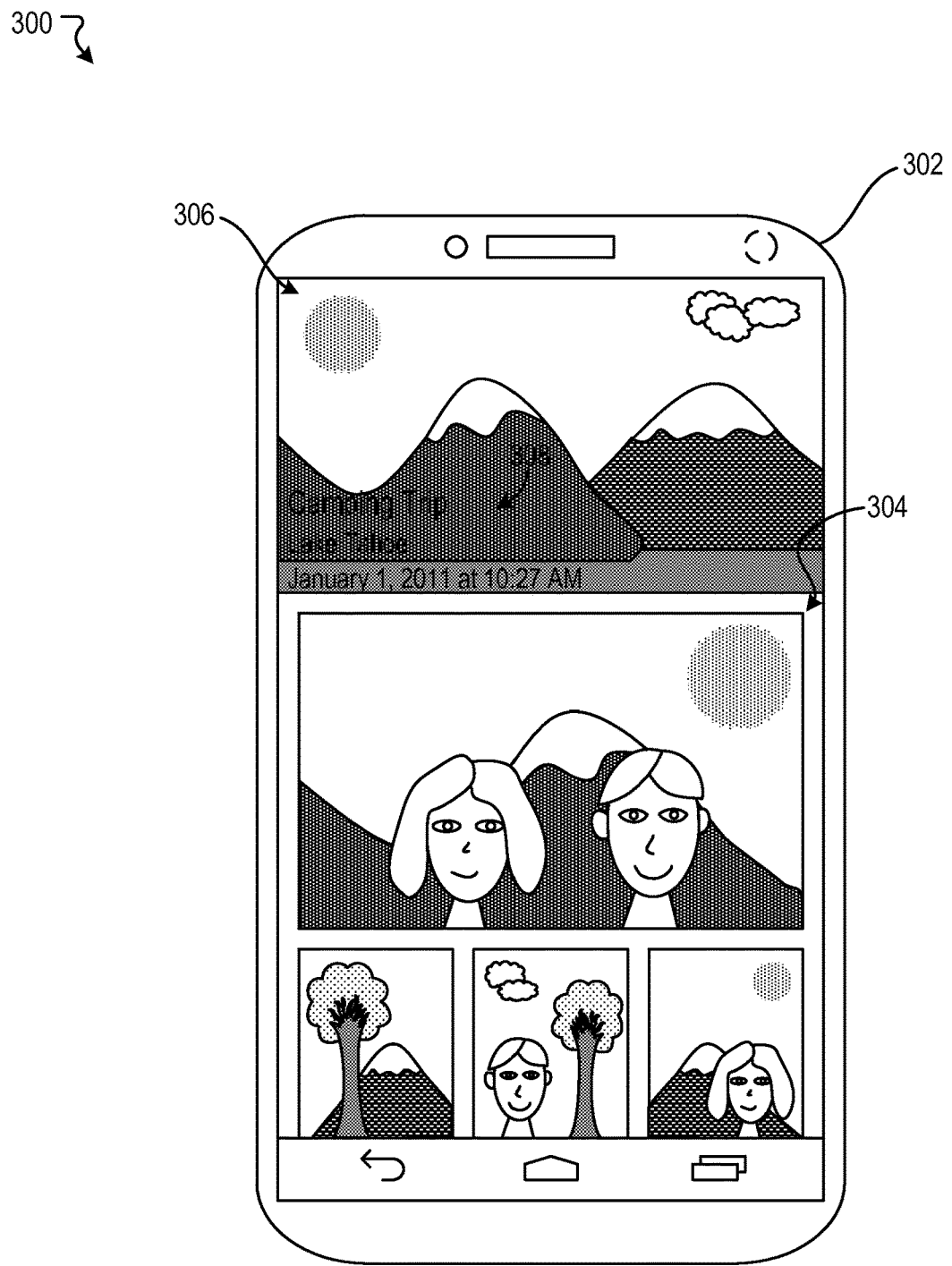
FIG. 3A illustrates an example scenario associated with generating and presenting publishable collections of related media content items, according to an embodiment of the present disclosure.

FIG. 3A illustrates an example scenario 300 associated with generating and presenting publishable collections of related media content items, according to an embodiment of the present disclosure. The example scenario 300 illustrates an example computing device (or system) 302, such as the user device 710 of FIG. 7, configured to utilize the related media content collection module 102 of FIG. 1. As shown in FIG. 3A, the example computing device 302 can present a collection of media content items that have been determined to be related, such as media content items acquired during a trip to Lake Tahoe on Jan. 1, 2011.

As discussed, the collection of media content items can be presented as a collage 304 based on a layout customized for the collection of media content items. In this example scenario 300, the collection can include, but is not limited to, three media content items each having a portrait orientation and one media content item having a landscape orientation. Moreover, the one media content item in the landscape orientation can depict more users than the other media content items. As such, the computing device 302 can present the collage based on a layout portion having a larger horizontal frame above three smaller vertical frames, as shown. The one media content item in the landscape orientation can be placed into the larger horizontal frame while the three media content items in the portrait orientation can be placed into the three smaller vertical frames.

Additionally, in some instances, the disclosed technology can select and present a cover photo (or video) 306 for the collection. Furthermore, in some cases, the disclosed technology can generate details 308 about the collection, such as a title, a description, a caption, a location, a time, and/or a date, etc., based on acquired information about the collection. Again, it is contemplated that all examples herein are provided for illustrative purposes and that many variations are possible.

Figure 3B:
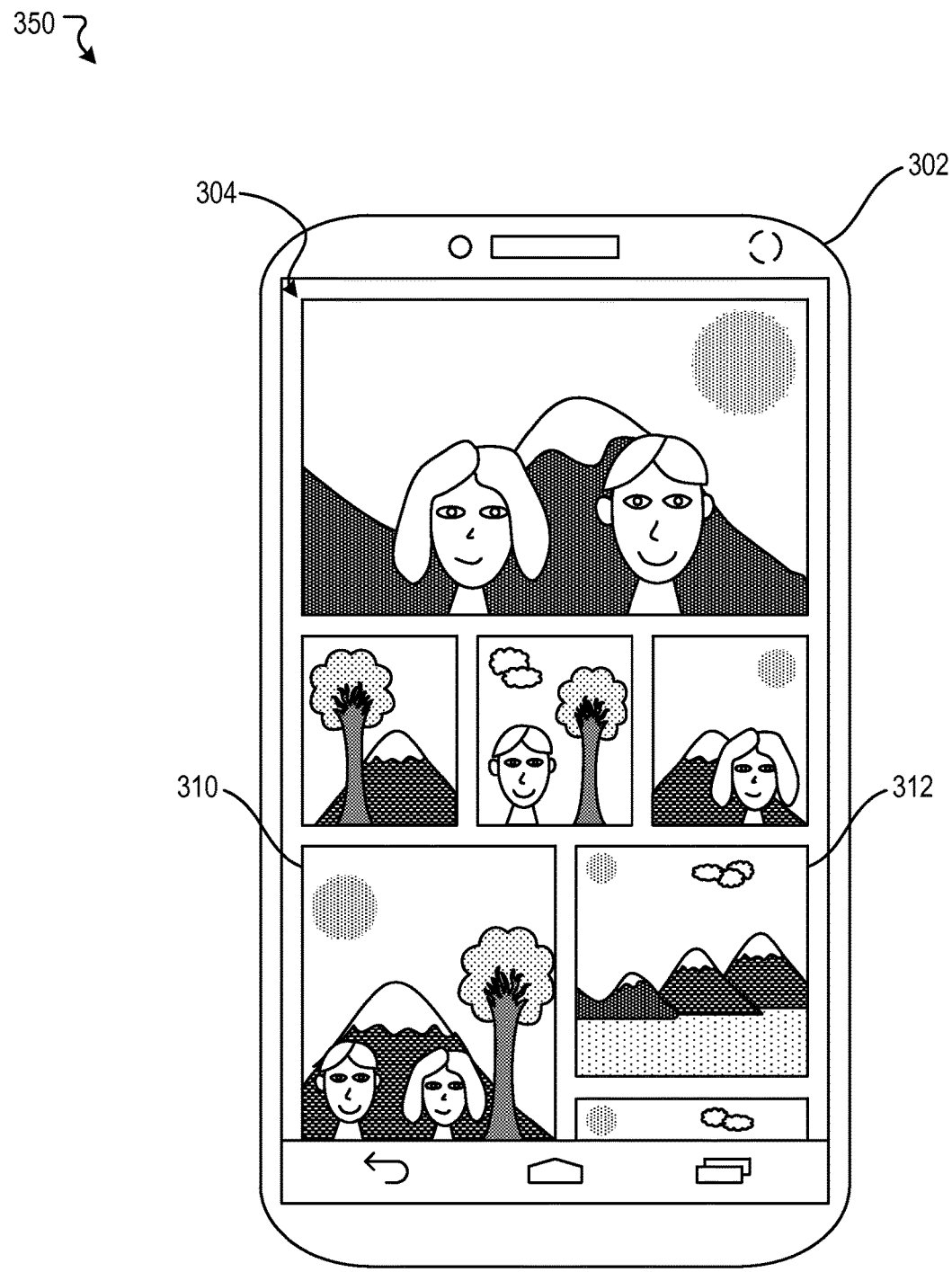
FIG. 3B illustrates an example scenario associated with generating and presenting publishable collections of related media content items, according to an embodiment of the present disclosure.

FIG. 3B illustrates an example scenario 350 associated with generating and presenting publishable collections of related media content items, according to an embodiment of the present disclosure. The example scenario 350 illustrates the computing device 302 of FIG. 3A. In the example scenario 350 of FIG. 3B, a user or viewer has scrolled down in the collage 304. As a result, the computing device 302 can present more media content items of the collage 304, such as a series (or a burst) 310 of images and a video 312.

In this example scenario 350, the layout of the collage 304 is still customized based on the media content items in the collage 304, including the series 310 of images and the video 312. The series 310 of images can, for example, be acquired when a record button for a camera has been pressed and held down for some time (e.g., within a second, within a few seconds, etc.), thus resulting in the image series 310 being captured. When the image series 310 of the collage 304 is viewable, such as in FIG. 3B, the disclosed technology can automatically present a playback of the image series 310. Each image in the series 310 can be played back, presented, or displayed over time. In some cases, there can be a fading animation (e.g., cross-fade) when transitioning from one image in the series to a next image in the series. Furthermore, the video 312 can be automatically played back as well. Many variations are possible.

Figure 4A:
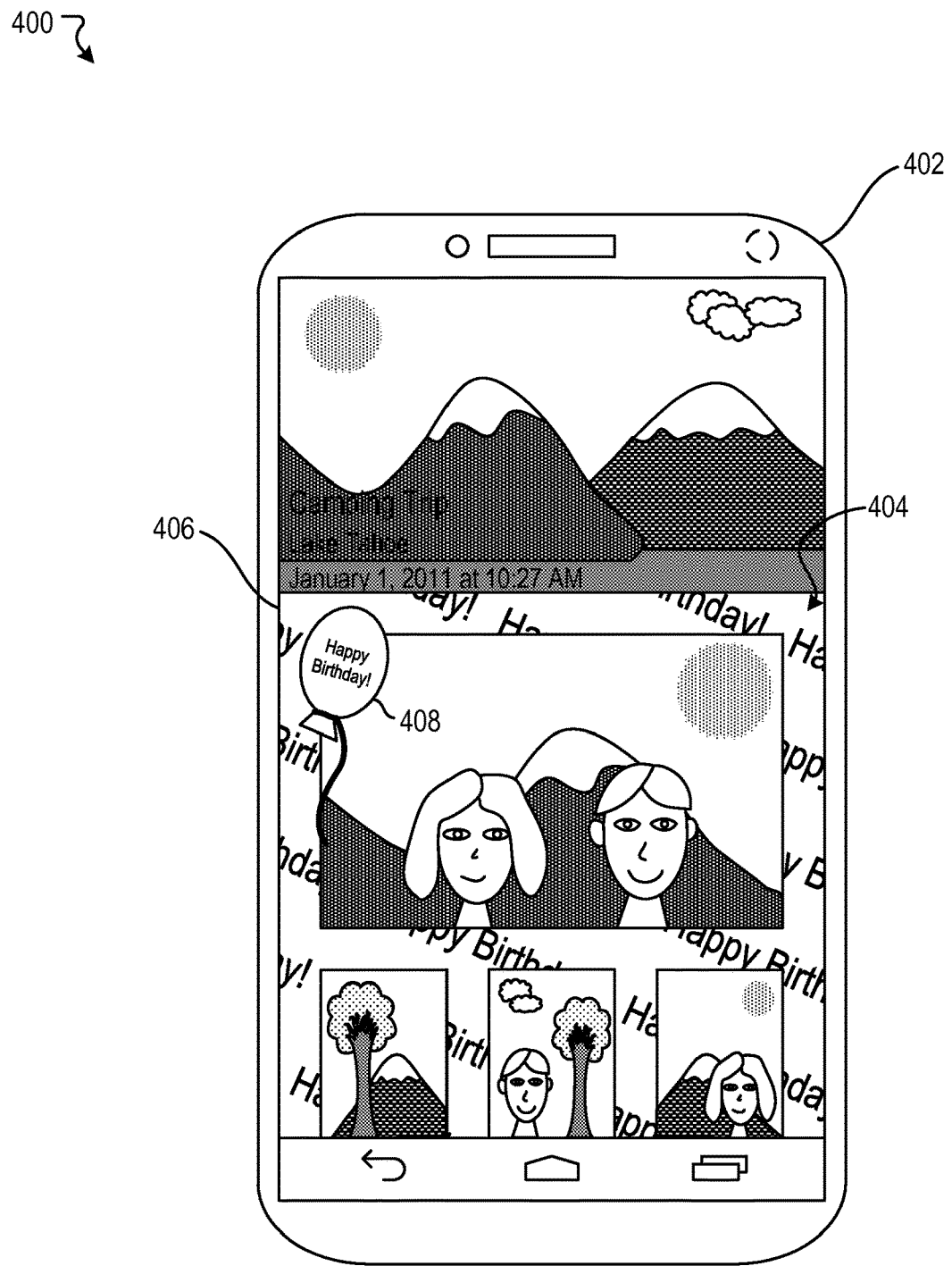
FIG. 4A illustrates an example scenario associated with generating and presenting publishable collections of related media content items, according to an embodiment of the present disclosure.

FIG. 4A illustrates an example scenario 400 associated with generating and presenting publishable collections of related media content items, according to an embodiment of the present disclosure. The example scenario 400 illustrates an example computing device (or system) 402, such as the computing device 302 of FIG. 3A, configured to utilize the related media content collection module 102 of FIG. 1. As shown in FIG. 4A, the example computing device 402 can present a collection of media content items that have been determined to be related, such as media content items acquired at Lake Tahoe on Jan. 1, 2011. The collection can be presented as a collage 404 based on a layout customized for the collection.

In the example scenario 400, a particular virtual overlaying template 406 can be selected based on acquired contextual information associated with the media content items in the collage 404. As shown, the collage 404 and the particular virtual overlaying template 406 can be presented in conjunction. Moreover, selecting the particular virtual overlaying template 406 based on the contextual information can include determining, based on analyzing the contextual information, a theme associated with the media content items in the collage 404. In this example, it can be determined that January 1 is the birthday of a user associated with media content items in the collage 404, and therefore the theme can correspond to birthdays. The particular virtual overlaying template 406 can thus be selected based on its relevancy to birthdays. Additionally, in this example, the particular template 406 can also include a visible element associated with the theme, such as a "Happy Birthday!" sticker 408. As discussed, there can be many variations or other possibilities.

Figure 4B:
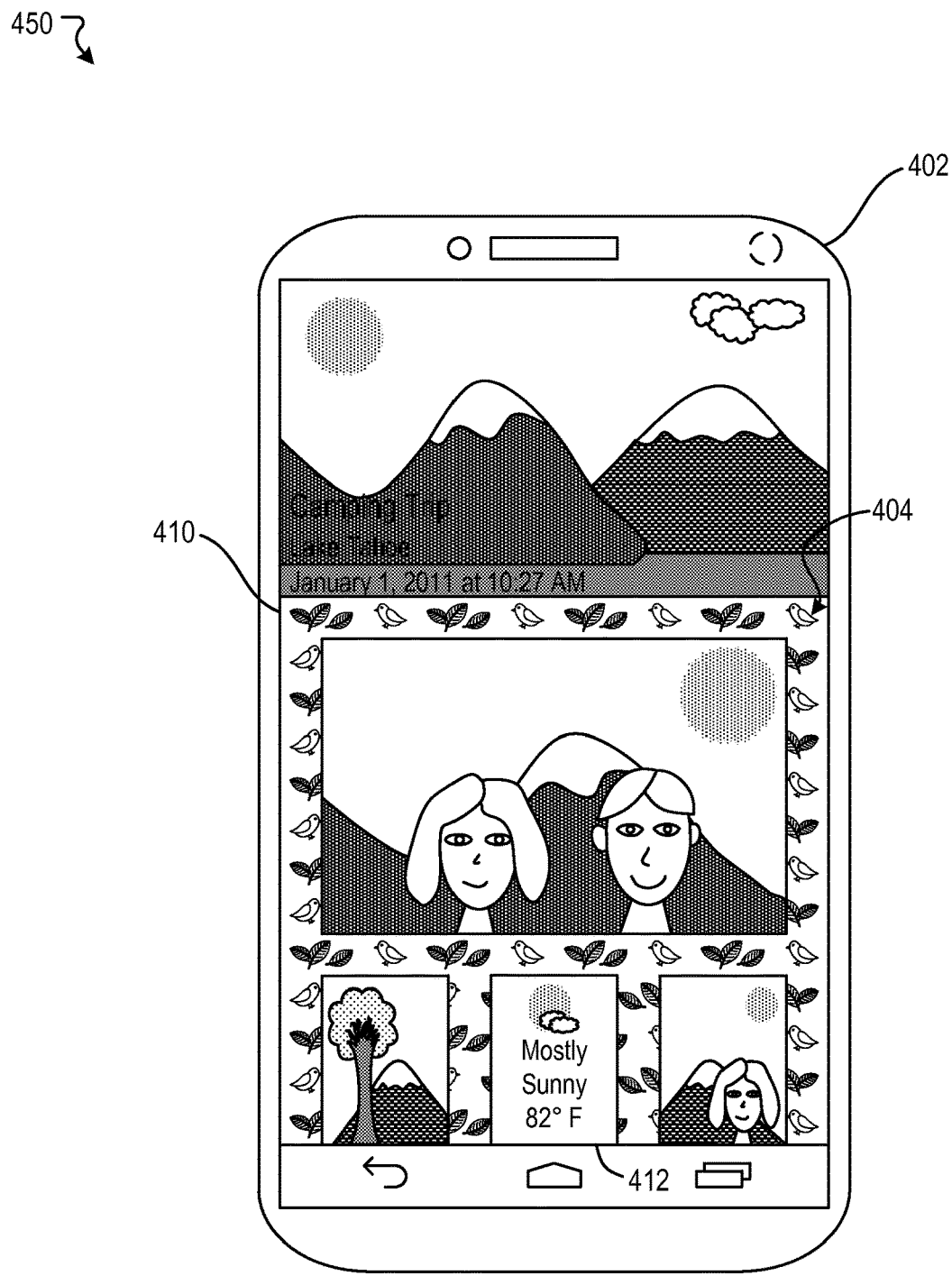
FIG. 4B illustrates an example scenario associated with generating and presenting publishable collections of related media content items, according to an embodiment of the present disclosure.

FIG. 4B illustrates an example scenario 450 associated with generating and presenting publishable collections of related media content items, according to an embodiment of the present disclosure. The example scenario 450 illustrates the computing device 402 of FIG. 4A. In the example scenario 450 of FIG. 4B, the disclosed technology can, for instance, determine another theme, such as an outdoors theme. Accordingly, another virtual overlaying template can selected based on the theme. In this example, a virtual overlaying template 410 depicting birds and leaves can be selected based on the outdoors theme. The birds-and-leaves template 410 can be presented in conjunction with the collage 404.

Furthermore, in some embodiments, the media content items in the collage 404 can be presented via a plurality of tiles. In the example scenario 450, one 412 of the plurality of tiles can present an atmospheric state (e.g., weather, temperature, etc.) icon that is dynamically updatable in (or near) real-time. Many variations are possible.

Figure 5A:
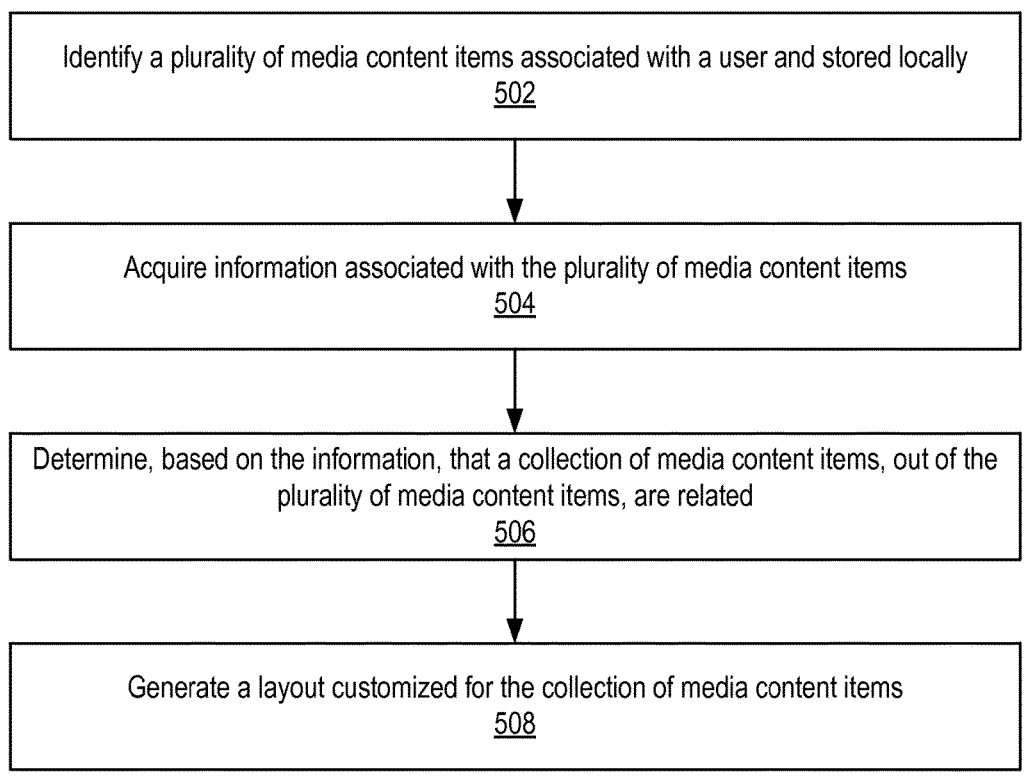
FIG. 5A illustrates an example method associated with generating and presenting publishable collections of related media content items, according to an embodiment of the present disclosure.

FIG. 5A illustrates an example method 500 associated with generating and presenting publishable collections of related media content items, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a plurality of media content items associated with a user and stored locally. At block 504, the example method 500 can acquire information associated with the plurality of media content items. The information can include at least one of time data, location data, or social graph data. At block 506, the example method 500 can determine, based on the information, that a collection of media content items, out of the plurality of media content items, are related. At block 508, the example method 500 can generate a layout customized for the collection of media content items.

FIG. 5B illustrates an example method 550 associated with generating and presenting publishable collections of related media content items, according to an embodiment of the present disclosure. As discussed above, it should be appreciated that there can be additional, fewer, or alternative steps performed in similar or alternative orders, or in parallel, within the scope of the various embodiments unless otherwise stated.

At block 552, the example method 550 can determine that one or more media content items in the plurality of media content items have less than a specified threshold confidence of being relevant for publishing. At block 554, the example method 550 can prevent the one or more media content items from being included in the collection of media content items. At block 556, the example method 550 can present the collection of media content items as a collage of media content items based on the layout. At block 558, the example method 550 can provide an option for the user to publish the collage of media content items.

Figure 6A:
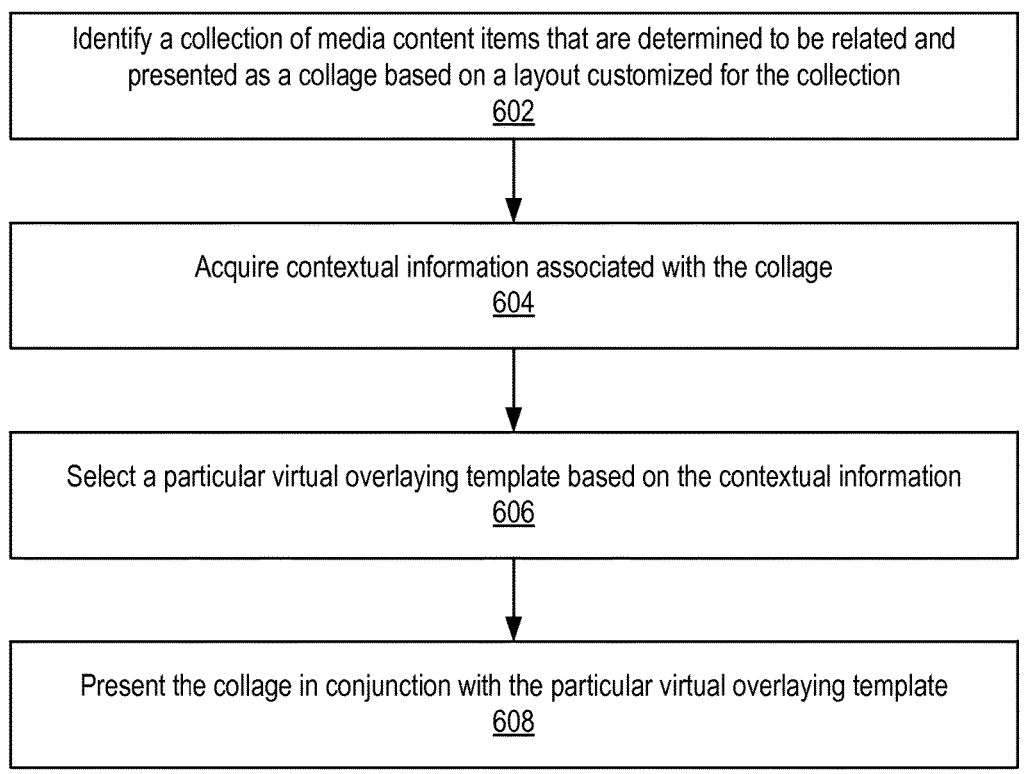
FIG. 6A illustrates an example method associated with generating and presenting publishable collections of related media content items, according to an embodiment of the present disclosure.

FIG. 6A illustrates an example method 600 associated with generating and presenting publishable collections of related media content items, according to an embodiment of the present disclosure. As discussed previously, it should be understood that there can be additional, fewer, or alternative steps performed in similar or alternative orders, or in parallel, within the scope of the various embodiments unless otherwise stated.

At block 602, the example method 600 can identify a collection of media content items that are determined to be related. The collection can be presented as a collage based on a layout customized for the collection. At block 604, the example method 600 can acquire contextual information associated with the collage. The contextual information can include at least one of time data, location data, or social graph data. At block 606, the example method 600 can select a particular virtual overlaying template based on the contextual information. At block 608, the example method 600 can present the collage in conjunction with the particular virtual overlaying template.

FIG. 6B illustrates an example method 650 associated with generating and presenting publishable collections of related media content items, according to an embodiment of the present disclosure. Again, it should be understood that there can be additional, fewer, or alternative steps performed in similar or alternative orders, or in parallel, within the scope of the various embodiments unless otherwise stated.

At block 652, the example method 650 can determine, based on analyzing the contextual information, a theme associated with the media content items in the collage. At block 654, the example method 650 can identify one or more virtual overlaying templates that each have at least a respective threshold confidence of relevancy with respect to the theme. At block 656, the example method 650 can select the particular virtual overlaying template out of the one or more virtual overlaying templates.

In some embodiments, collections of media content items presented as collages can be referred to as albums, moments, events, stories, and/or souvenirs, etc. In some instances, there can be single-day collections and multi-day collections (e.g., weekend collections, one week collections, one month collections, etc.). In some cases, multiple collections can be merged. In some implementations, the disclosed technology can automatically generate captions, titles, descriptions, and/or tags, etc., for collections based on information (e.g., contextual information) associated with the collections. The captions, titles, descriptions, and/or tags can, in some cases, be suggested to the user and can be editable by the user. Information provided or shared by the user can also be acquired, pulled, received, and/or utilized. For example, when the user posts a status update about being at a particular location, the particular location can be automatically added as a tag, added into a description, and/or added into a title for a collection(s) of media content items created at the particular location. In some instances, other media content, information, maps, and/or audio, etc., can be added to collections. In some cases, media or other information (e.g., properties, files, etc.) can be acquired from third-party resources to be utilized by the disclosed technology. Moreover, in some embodiments, photo filtering and media editing (e.g., cropping, rotating, brightening, sharpening, color editing, etc.) can be applied to the media content items in collections, such as to all media content items within each collection. In some instances, edits, modifications, or customizations (e.g., adding media, removing media, highlighting objects, changing image animations, etc.) to collections of media content items can be made by users. In some cases, the edits, modifications, or customizations, as well as information about the collections of media content items, can be saved, logged, or recorded. This can, for example, be used to perform training and/or learning in order to improve future recommendations or suggestions.

Additionally, in some implementations, clicking on, tapping on, or otherwise interacting with a series (or a burst) of images can expand the series of images to show all images in the series. In some instances, the animation of an image series in a collection is not only a preview of the collection, but rather a sequential display of each and every image in the series. Furthermore, animated media content or collages can be surfaced in a feed of the social networking system. In some embodiments, the disclosed technology can automatically detect media content and notify the user when a collage is generated based on the detected media content. In some cases, historical data can be utilized by the disclosed technology to learn how one or more users tend to create, curate, and/or edit collages.

Furthermore, in some embodiments, the disclosed technology can automatically animate through media content items in a collection with or without background music. For instance, when the user tilts, rotates, or positions his or her computing device into a landscape or horizontal orientation, the automatic animation can be provided. When the user tilts, rotates, or positions his or her computing device into a portrait or vertical orientation, then the collage can be interactive, scrollable, and/or navigable, etc., with respective to the user (e.g., based on user commands).

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
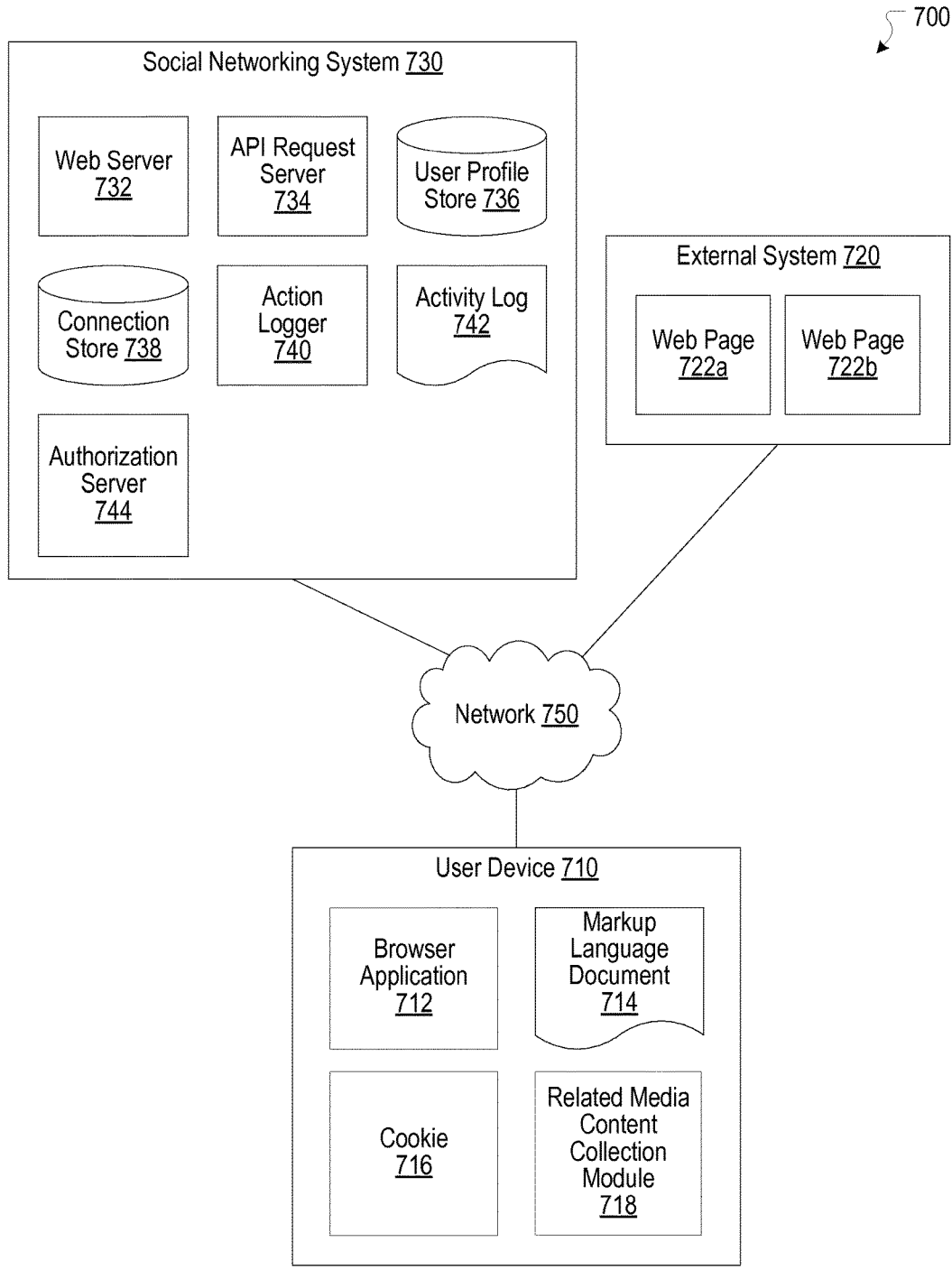
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a related media content collection module 718. The related media content collection module 718 can, for example, be implemented as the related media content collection module 102 of FIG. 1. As discussed previously, it should be appreciated that there can be many variations or other possibilities. For example, in some instances, the related media content collection module 718 (or at least a portion thereof) can be included in the social networking system 730. Other features of the related media content collection module 718 are discussed herein in connection with the related media content collection module 102.

Hardware Implementation

Figure 8:
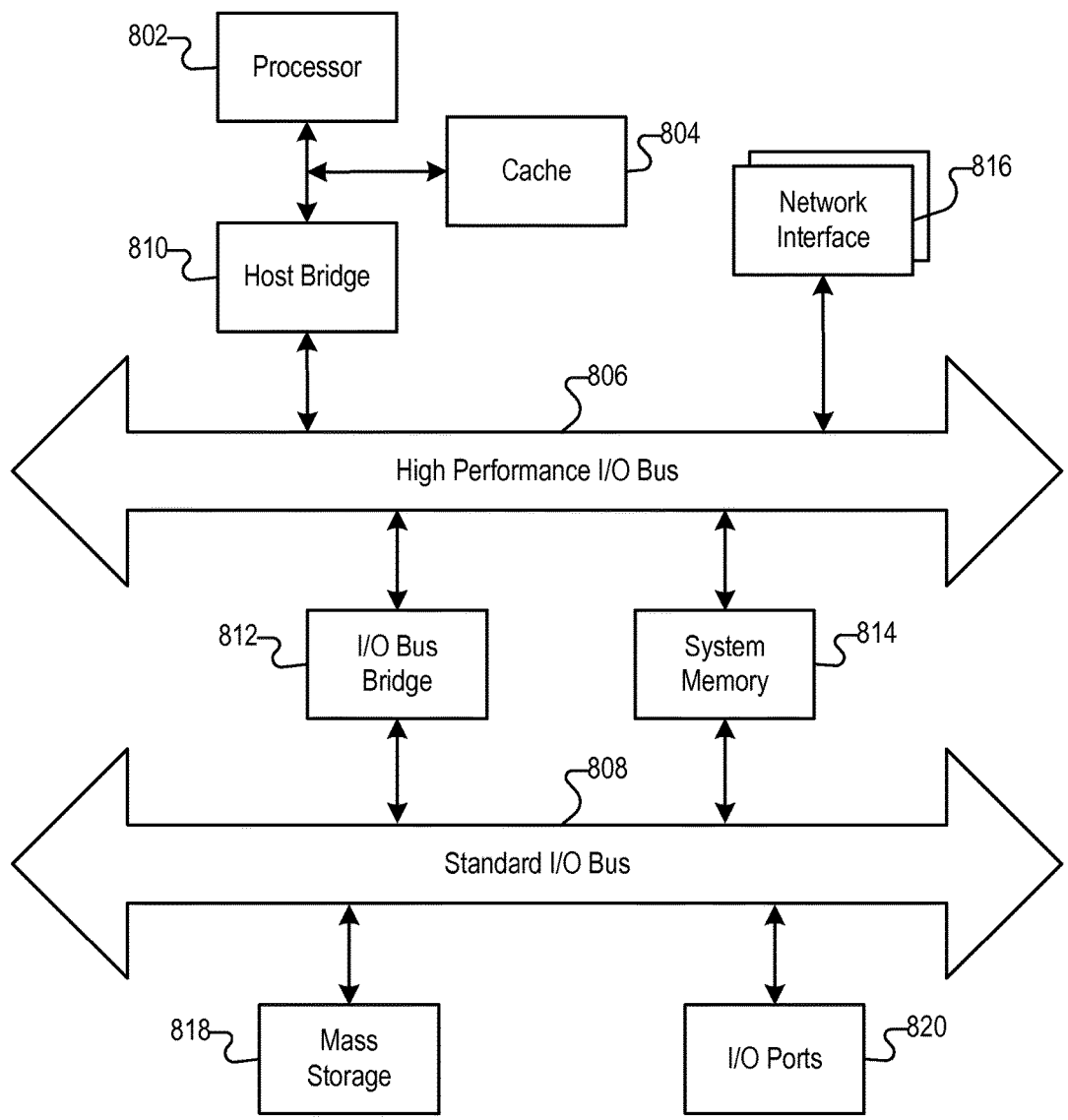
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
  identifying, by a computing system, a plurality of media content items associated with a user and stored locally;
  acquiring, by the computing system, information associated with the plurality of media content items, the information including at least one of time data, location data, or social graph data;
  determining, by the computing system, based on the information, that a collection of media content items, out of the plurality of media content items, are related;
  generating, by the computing system, a layout customized for the collection of media content items, wherein the layout comprises a plurality of frames, and a quantity and orientation of the plurality of frames is customized based on the quantity of media content items in the collection of media content items and orientations of the media content items in the collection of media content items;

generating, by the computing system, a collage comprising the collection of media content items based on the layout, wherein the collage presents each media content item of the collection of media content items within the layout customized for the collection of media content items; and receiving, by the computing system, a command from the user to publish the collage to a social networking system, wherein the collection of media content items comprises a first video, the plurality of frames in the layout customized for the collection of media content items comprises a first frame for presenting the first video, and presentation of the collage to a viewing user via the social networking system causes the first video to automatically play within the first frame of the layout while additional media content items of the collection of media content items are simultaneously presented in other frames of the plurality of frames.

2. The computer-implemented method of claim 1, further comprising:

determining that one or more media content items in the plurality of media content items have less than a specified threshold confidence of being relevant for publishing; and preventing the one or more media content items from being included in the collection of media content items.

3. The computer-implemented method of claim 1, further comprising:

applying one or more object recognition processes with respect to the collection to recognize one or more objects depicted in at least one media content item in the collection; and placing the at least one media content item in a larger frame of the collage relative to other frames in which other media content items in the collage are placed.

4. The computer-implemented method of claim 3, wherein the one or more object detection processes include at least one of a face detection process, a face recognition process, or an image classification process.

5. The computer-implemented method of claim 3, wherein, prior to placing the at least one media content item in the larger frame of the collage, the one or more object detection processes recognizes, in the at least one media content item, at least one of: 1) a threshold quantity of objects or 2) a face of a friend having at least a specified threshold social affinity level with respect to the user.

6. The computer-implemented method of claim 1, wherein determining that the collection of media content items are related further comprises:

identifying, out of the plurality of media content items, at least one of: 1) a first set of media content items that are acquired within an allowable time deviation from one another in the first set based on the time data, 2) a second set of media content items that are acquired within an allowable locational deviation from one another in the second set based on the location data, or 3) a third set of media content items that have at least a threshold level of social commonality relative to one another in the third set based on the social graph data; and including at least one of the first set, the second set, or the third set in the collection of media content items.

7. The computer-implemented method of claim 1, wherein the collection of media content items further comprises at least one of an image, a series of images acquired within a particular time frame, or an audio.

8. The computer-implemented method of claim 7, wherein the collection of media content items includes a series of images acquired within a particular time frame, and presentation of the collage via the social networking system further causes an animation of the series of images to automatically play within a second frame of the layout while additional media content items of the collection of media content items are simultaneously presented in other frames of the plurality of frames.

9. The computer-implemented method of claim 7, further comprising:

applying one or more image analysis processes with respect to the series of images;

determining, based on the one or more image analysis processes, that one or more images out of the series of images have less than a threshold level of image similarity with respect to other images in the series of images; and removing the one or more images from the series of images.

10. A system comprising:

at least one processor; and a memory storing instructions that, when executed by the at least one processor, cause the system to perform:

identifying a plurality of media content items associated with a user and stored locally;

acquiring information associated with the plurality of media content items, the information including at least one of time data, location data, or social graph data;

determining, based on the information, that a collection of media content items, out of the plurality of media content items, are related;

generating a layout customized for the collection of media content items, wherein the layout comprises a plurality of frames, and a quantity and orientation of the plurality of frames is customized based on the quantity of media content items in the collection of media content items and orientations of the media content items in the collection of media content items;

generating a collage comprising the collection of media content items based on the layout, wherein the collage presents each media content item of the collection of media content items within the layout customized for the collection of media content items; and receiving a command from the user to publish the collage to a social networking system, wherein the collection of media content items comprises a first video, the plurality of frames in the layout customized for the collection of media content items comprises a first frame for presenting the first video, and presentation of the collage to a viewing user via the social networking system causes the first video to automatically play within the first frame of the layout while additional media content items of the collection of media content items are simultaneously presented in other frames of the plurality of frames.

11. The system of claim 10, wherein the instructions cause the system to further perform:

determining that one or more media content items in the plurality of media content items have less than a specified threshold confidence of being relevant for publishing; and preventing the one or more media content items from being included in the collection of media content items.

12. The system of claim 10, wherein the instructions cause the system to further perform:
applying one or more object recognition processes with respect to the collection to recognize one or more objects depicted in at least one media content item in the collection; and
placing the at least one media content item in a larger frame of the collage relative to other frames in which other media content items in the collage are placed.

13. The system of claim 12, wherein the one or more object detection processes include at least one of a face detection process, a face recognition process, or an image classification process.

14. The system of claim 12, wherein, prior to placing the at least one media content item in the larger frame of the collage, the one or more object detection processes recognizes, in the at least one media content item, at least one of: 1) a threshold quantity of objects or 2) a face of a friend having at least a specified threshold social affinity level with respect to the user.

15. A non-transitory computer-readable storage medium including instructions that, when executed by at least one processor of a computing system, cause the computing system to perform:
identifying a plurality of media content items associated with a user and stored locally;
acquiring information associated with the plurality of media content items, the information including at least one of time data, location data, or social graph data;
determining, based on the information, that a collection of media content items, out of the plurality of media content items, are related;
generating a layout customized for the collection of media content items, wherein the layout comprises a plurality of frames, and a quantity and orientation of the plurality of frames is customized based on the quantity of media content items in the collection of media content items and orientations of the media content items in the collection of media content items;
generating a collage comprising the collection of media content items based on the layout, wherein the collage presents each media content item of the collection of media content items within the layout customized for the collection of media content items; and
receiving a command from the user to publish the collage to a social networking system, wherein
the collection of media content items comprises a first video,
the plurality of frames in the layout customized for the collection of media content items comprises a first frame for presenting the first video, and
presentation of the collage to a viewing user via the social networking system causes the first video to automatically play within the first frame of the layout while additional media content items of the collection of media content items are simultaneously presented in other frames of the plurality of frames.

16. The non-transitory computer-readable storage medium of claim 15, wherein the instructions cause the system to further perform:
determining that one or more media content items in the plurality of media content items have less than a specified threshold confidence of being relevant for publishing; and
preventing the one or more media content items from being included in the collection of media content items.

17. The non-transitory computer-readable storage medium of claim 15, wherein the instructions cause the system to further perform:
applying one or more object recognition processes with respect to the collection to recognize one or more objects depicted in at least one media content item in the collection; and
placing the at least one media content item in a larger frame of the collage relative to other frames in which other media content items in the collage are placed.

18. The non-transitory computer-readable storage medium of claim 17, wherein the one or more object detection processes include at least one of a face detection process, a face recognition process, or an image classification process.

19. The non-transitory computer-readable storage medium of claim 17, wherein, prior to placing the at least one media content item in the larger frame of the collage, the one or more object detection processes recognizes, in the at least one media content item, at least one of: 1) a threshold quantity of objects or 2) a face of a friend having at least a specified threshold social affinity level with respect to the user.

* * * * *